June 6, 1950  J. D. KENNELLY  2,510,892
OSCILLATING LIGHT STRUCTURE
Filed Feb. 28, 1948  2 Sheets-Sheet 1
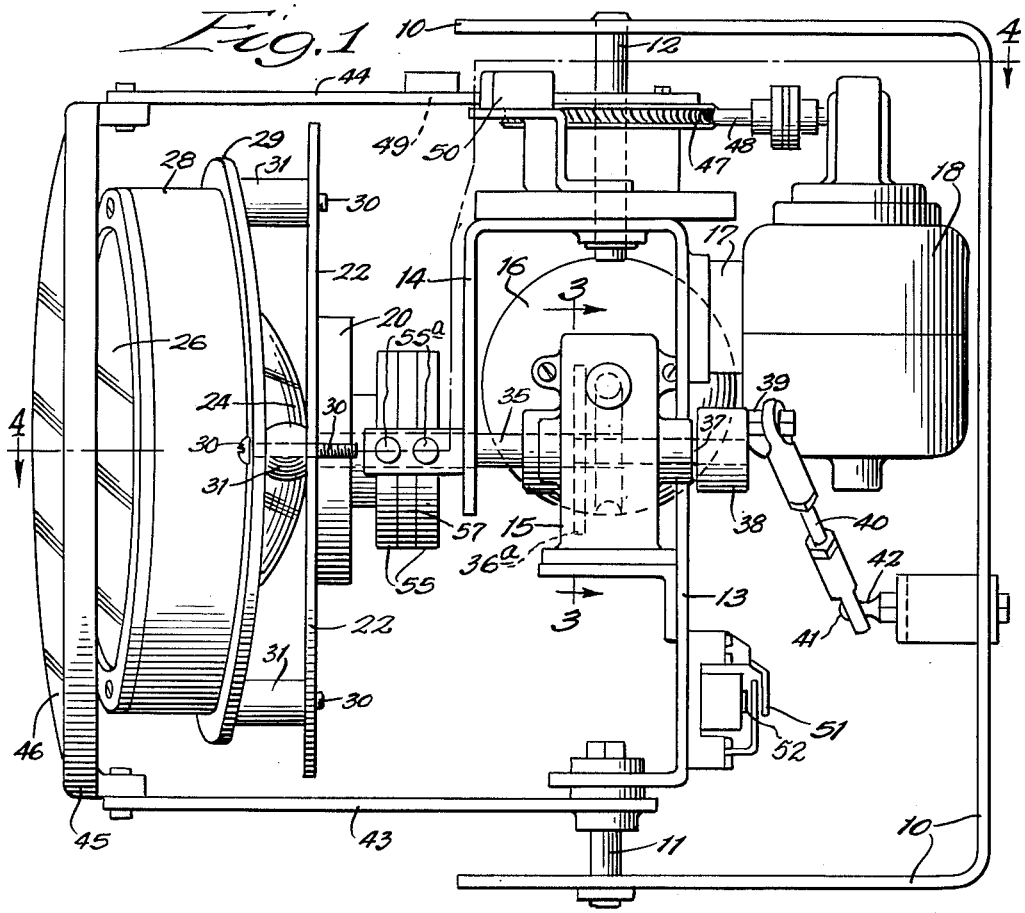
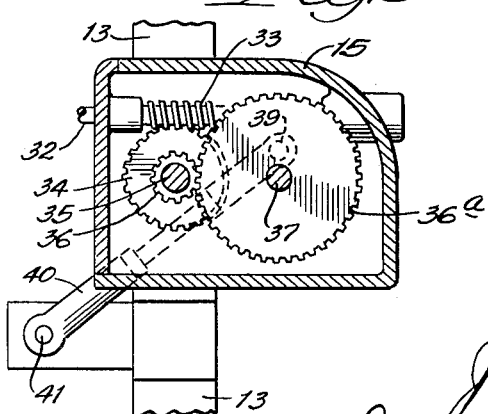
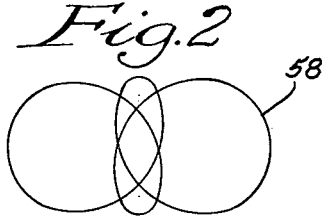
Inventor:
Jeremiah D. Kennelly,
By Dawson, Ooms, Booth & Spangenberg,
Attorneys.

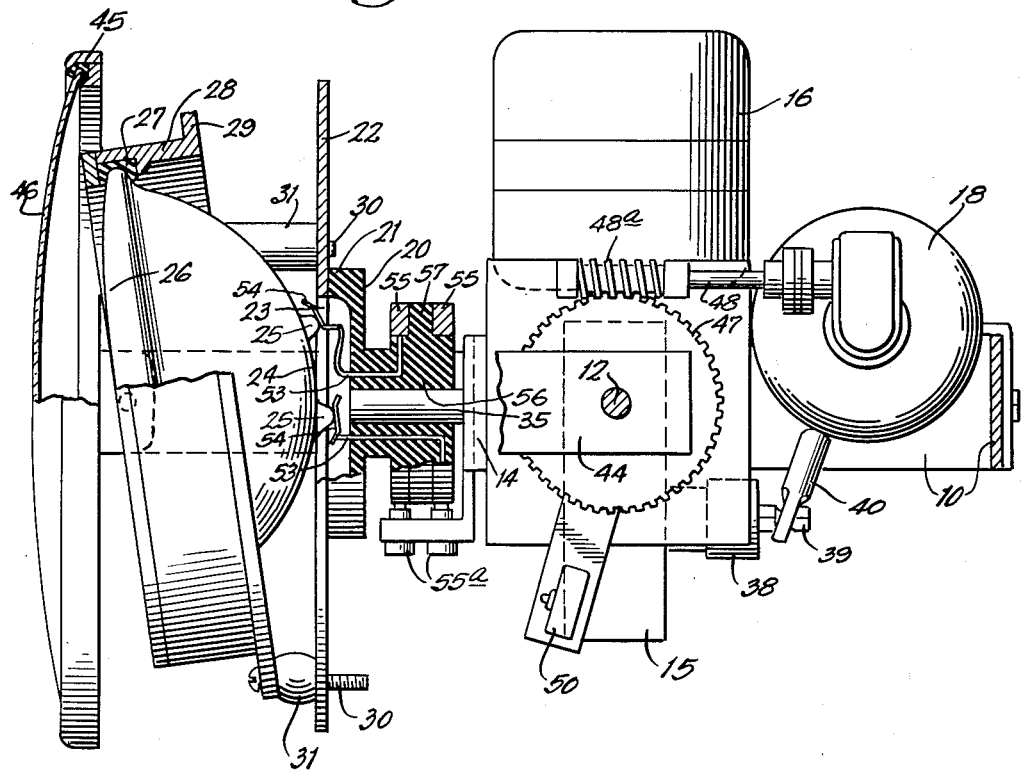

Patented June 6, 1950

2,510,892

UNITED STATES PATENT OFFICE 2,510,892

OSCILLATING LIGHT STRUCTURE

Jeremiah D. Kennelly, Oak Park, Ill.

Application February 28, 1948, Serial No. 12,041

5 Claims. (Cl. 177—329)

This invention relates to an oscillating light structure, and more particularly to signal-light apparatus useful with locomotives, trains, vessels, ships, aeroplanes, emergency vehicles, and other vehicles upon which signal-light devices are desirable.

An object of the present invention is to provide a signal-light structure of novel construction, in which a light-projecting source is rotated or oscillated. A further object is to provide a light structure in which the chassis supporting the motor and light-moving parts, is mounted for pivotal movement, while at the same time means are provided for rotating or moving a sealed beam light. A still further object is to provide a structure in which a sealed-beam light or other light-projecting means is mounted for support in various annular directions, while at the same time means are provided for rotating or oscillating the light. A still further object is to provide means associated with a pivoted chassis structure for moving a lens or colored light cover. Other specific objects and advantages will appear as the specification proceeds.

The invention is illustrated, in a preferred embodiment, by the accompanying drawing, in which, Figure 1 is a side view in elevation of apparatus embodying my invention; Fig. 2, a diagrammatic view of an illustrative pattern of light which may be produced by the mechanism; Fig. 3, a sectional detail view, the section being taken as indicated at line 3 of Fig. 1; and Fig. 4, a broken top plan view of a portion of the apparatus supported by the chassis.

In the illustration given, 10 designates a frame which is fixed to the locomotive or to a casing carried by any other vehicle, etc. It will be understood that the stationary structure 10 may be housed within a casing already provided in a locomotive or other vehicle, or it may be equipped with its own casing for enclosing all of the structure except the forward portion thereof. Extending inwardly from the fixed frame 10 are the pivot pins or shafts 11 and 12. A chassis support member 13 is rotatably mounted at one end upon the pivot shaft 11, and at the other end upon the pivot shaft 12. The member 13 is provided with an extension 14, as shown more clearly in Fig. 1. Mounted upon the chassis support 13 in a gear casing member 15 and a motor 16. Also there is supported upon the chassis, by means of the connection 17, a second motor 18.

The chassis support extension 14 is apertured to provide a bearing for a shaft 35 fixed at its forward end to a plate 20. The plate 20, as shown more clearly in Fig. 4, is provided with a peripheral annular ring portion 21 welded to a backing plate 22. The backing plate 22 is centrally cut away at 23 to receive the curved rear portion of the sealed beam light casing 24. The sealed beam light structure 24 is a well-known structure and need not be described in detail. It provides a reflector, a light source sealed within the reflector and equipped with rearwardly-extending lead seals 25, and at the front of the structure is provided a transparent lens 26. As shown more clearly in Fig. 4, the forward end of the sealed beam light structure is received within a resilient ring 27 supported by a cylindrical casing 28 having a laterally-extending flange 29. Bolts 30 extend through the flange 29 at spaced intervals and engage threaded recesses in the backing plate 22. A resilient sleeve 31 of rubber or other suitable material encircles the bolt 30 and may be squeezed between the flange 29 and backing plate 22 when the bolt is screwed within its threaded recess in backing plate 22, as illustrated in Fig. 4.

The motor 16 drives a shaft 32 provided with a worm 33, as shown more clearly in Fig. 3. The worm 33 drives the worm gear 34 mounted on shaft 35, and the pinion 36 on shaft 35 drives the gear 36ª mounted on shaft 37. Shaft 37 drives a disk 38 equipped with an eccentric pin 39. A turn-buckle link 40 connects the pin 39 and a bolt head 41 carried by the stationary pin 42 fixed, as shown in Fig. 1 to the stationary frame 10. Thus, as the disk 38 is rotated, the eccentric pin 39 causes a reciprocation of the entire chassis mounted on the pivot shafts 11 and 12. Supported by the pivot shafts 11 and 12 are the lens-supporting arms 43 and 44. Arm 43 is rotatably mounted on shaft 11, while arm 44 is fixed to gear 47 rotatable on shaft 12. The arms 43 and 44 extend forwardly and support a lens ring 45. The lens ring carries a lens 46, which may be plain or provided with prisms and which may be of any desired color. For most purposes, the lens 46 will be colored red, so that it may serve as a warning light when the cover lens 46 is placed in position in front of the lens 26 of the sealed beam light, as shown more clearly in Fig. 1.

Any suitable means for operating the arms 43 and 44 may be employed. In the illustration given the shaft 12 rotatably carries a worm gear 47, which meshes with a worm driven by the shaft 48. The shaft 48 is, in turn, driven by reduction gears operated by the shaft of motor 18. When motor 18 is set into operation, shaft 48 rotates to drive the worm 48ª meshing with the worm gear 47, thus producing rotation around shaft 12. The rotation of gear 47 causes the arm 44 to be moved therewith, and arm 43 swings freely upon the shaft 11.

If desired, limit switches may be provided for cutting off the motor 18 after it reaches the limits of its movement. Such limit switches are indicated by the numerals 49 and 50 and are actuated by arm 44. Relay switch structure 51 may be provided for manual or for electrical operation of the motor 18 or motor 16. For electrical control of the switch, a solenoid 52 is provided, which will be operated by the closing of a switch at some point exterior of the frame 10. Since such structures are well known, a detailed description herein is believed unnecessary.

For supplying current to the sealed beam light 24 two collector rings 55 are mounted on the hub of part 20 being insulated from same. Leads 53 connect collector rings 55 to contacts 54 which are part of sealed beam light 24. Contact brushes 55ª complete the circuit.

While in the description given the frame 10 has been indicated as being in the shape of a vertical-U member so that the chassis swings in a lateral plane thereon, if desired, the frame 10 may be supported in a horizontal plane so that the chassis may swing up and down upon the pivot shafts 11 and 12 and, similarly, the lens-supporting arms 43 and 44 may swing in a vertical plane.

*Operation*

In the operation of the apparatus, the motor 16 is set in operation, and the motor shaft 32 causes worm 33 to rotate the worm gear 34 fixed upon shaft 35. Shaft 35 causes a rotation of the collar 56 and plate 20, and thereby the backing plate 22. Since the sealed beam light is fixed upon the backing plate 22, the lamp within the casing 24 rotates with the plate. Simultaneously, the shaft 37 is rotated by means of the engagement of gear 36ª and the pinion 36. Shaft 37 rotates the disk 38 and the eccentric pin 39. By reason of the coupling 40 between the pin 39 and the fixed ball bearing 41, there is a movement of the entire chassis backward and forward on the pivot pins 11 and 12. If the frame 10 is supported in a vertical position, the chassis will swing in a lateral direction. If the frame 10 is supported in a horizontal plane, the chassis will swing upward and downward upon the pivot pins 11 and 12. If it is desired to drop the colored lens 46 into position in front of the rotating lens 26 and while the chassis also is oscillating, the motor 18 is set into operation to rotate shaft 12, and thereby to swing the lens 46 into a position in front of the light 26. This causes warning light rays to be projected. Similarly, the motor 18 may be reversed in direction to move the arms 43 and 44 in the opposite direction to move the lens 46 away from the lens 26.

My invention in operation causes the light beam from sealed beam unit 24 to move in a conical path around the shaft 35 as an axis and at the same time causes shaft 35 to move from side to side in an oscillatory motion. This produces a startling effect, the precise pattern produced being dependent on the relative speeds of the rotary and oscillatory motions. A preferred pattern, which is shown diagrammatically in Figure 2, is that achieved by the arrangement in which one and one-half revolutions of shaft 35 occur in the time required for a single transverse movement of the chassis from maximum left to maximum right position. It will of course be understood that the relative rates of rotary and oscillatory motion will be governed by the relative sizes of the driving gears 36 and 36ª. The preferred form of light pattern designated by numeral 58 in Fig. 2 is obtained when gear 36ª has three times the diameter of gear 36.

While, in the foregoing structure, I have set forth one embodiment of the invention in great detail for the purpose of illustrating such embodiment, it will be understood that such details may be varied widely by those skilled in the art without departing from the spirit of my invention.

I claim:

1. Signal-light apparatus comprising a frame, a chassis pivoted in the frame for partial rotation about a fixed axis, a beam-producing light source, a shaft rotatably mounted on the chassis, a support securing the light source to the shaft in eccentric relation thereto for rotation therewith, a disc mounted for rotation on the shaft, an eccentric pin on the disc, a fixed bearing on the frame, and a link connecting the eccentric pin to the bearing, said disc, pin, bearing, and link being operative upon rotation of the shaft to rock the chassis relative to the frame during shaft rotation, and motor means mounted on the chassis for rotating the shaft.

2. Apparatus according to claim 1 having a cover lens pivotally supported for reciprocating movement into and out of the path of the beam from the light source, second motor means, and mechanical linkage coupling said cover lens to said second motor means for moving said cover lens into and out of a beam-intercepting position.

3. Apparatus according to claim 1 wherein means are provided for varying the degree of eccentricity between the light source and the shaft.

4. In a light-projecting device, a frame, a shaft mounted in said frame, means for rotating said shaft, a plate mounted on said shaft and provided with a central opening, a sealed-beam light having a curved rear portion received within the opening of said plate for annular movement therein, a second plate fixed to the forward portion of said sealed-beam light and providing a flange, and adjustable mechanical supports connecting said flange and said first plate permitting the position of said sealed-beam light structure with respect to said first-mentioned plate to be varied within wide limits.

5. In a light-projecting device, a frame, a shaft mounted in said frame, means for rotating said shaft, a plate fixed to said shaft and having a central opening, a sealed-beam light having a curved rear portion received within the opening of said plate for annular movement therein, a second plate fixed to the forward portion of said sealed-beam light and providing a flange, and a plurality of bolts extending through said flange and said first plate in spaced-apart relation adapted to secure said second plate to said first plate, and resilient sleeves about said bolts between said flange and said first plate operable to permit said bolts to be screwed in or out within wide limits to shift the relative position of said sealed-beam light structure with respect to said first plate.

JEREMIAH D. KENNELLY.

REFERENCES CITED

The following references are of record in the file of this patent:

UNITED STATES PATENTS

| Number | Name | Date |
|---|---|---|
| 1,548,958 | Sperry | Aug. 11, 1925 |
| 2,409,046 | Kennelly | Oct. 8, 1946 |
| 2,417,934 | Kennelly | Mar. 25, 1947 |
| 2,446,333 | Kennelly | Aug. 3, 1948 |